United States Patent
Ternité et al.

(10) Patent No.: US 8,307,754 B2
(45) Date of Patent: Nov. 13, 2012

(54) SYSTEM COMPRISING A COFFEE MACHINE AND A PORTION CAPSULE

(75) Inventors: Rüdiger Ternité, Hamburg (DE); Klaus-Dieter Mund, Hamburg (DE); Sebastian Mauss, Ammersbek (DE); Hartmut Schweminski, Kr. Rotenburg/Wümme (DE)

(73) Assignee: TCHIBO GmbH, Hamburg (DE)

( * ) Notice: Subject to any disclaimer, the term of this patent is extended or adjusted under 35 U.S.C. 154(b) by 892 days.

(21) Appl. No.: 11/719,848

(22) PCT Filed: Oct. 31, 2005

(86) PCT No.: PCT/EP2005/011666
§ 371 (c)(1),
(2), (4) Date: Jan. 21, 2009

(87) PCT Pub. No.: WO2006/053635
PCT Pub. Date: May 26, 2006

(65) Prior Publication Data
US 2009/0126577 A1 May 21, 2009

(30) Foreign Application Priority Data
Nov. 19, 2004 (DE) .................. 10 2004 056 224

(51) Int. Cl.
*A47J 31/40* (2006.01)
(52) U.S. Cl. ..................... 99/280; 99/295; 99/302 R
(58) Field of Classification Search ............ 99/295, 99/289 R, 302 R, 305, 280, 283
See application file for complete search history.

(56) References Cited

U.S. PATENT DOCUMENTS

| 3,408,921 | A | * | 11/1968 | Freese | 99/295 |
|---|---|---|---|---|---|
| 4,136,202 | A | | 1/1979 | Favre | |
| 5,402,707 | A | | 4/1995 | Fond et al. | |
| 5,778,765 | A | * | 7/1998 | Klawuhn et al. | 99/290 |
| 5,948,455 | A | | 9/1999 | Schaeffer et al. | |
| 6,182,554 | B1 | * | 2/2001 | Beaulieu et al. | 99/289 R |
| 6,701,826 | B2 | * | 3/2004 | Wu | 99/305 |
| 7,021,197 | B2 | * | 4/2006 | Chen et al. | 99/291 |
| 7,219,599 | B2 | * | 5/2007 | Geiger | 99/299 |
| 7,543,527 | B2 | * | 6/2009 | Schmed | 99/295 |
| 7,856,920 | B2 | * | 12/2010 | Schmed et al. | 99/295 |
| 2001/0052294 | A1 | | 12/2001 | Schmed | |
| 2003/0172813 | A1 | | 9/2003 | Schifferle | |
| 2004/0250686 | A1 | * | 12/2004 | Hale | 99/295 |

(Continued)

FOREIGN PATENT DOCUMENTS
EP 0904717 A1 9/1988
(Continued)

*Primary Examiner* — Reginald L Alexander
(74) *Attorney, Agent, or Firm* — Hovey Williams LLP

(57) ABSTRACT

The invention relates to a coffee machine for brewing a hot drink, in particular, a coffee drink, by means of a portion capsule with a capsule lid and a capsule base, comprising a pressurized water device, a portion capsule holder and a controller. The portion capsule holder is provided with two relatively-displaceable puncture means, which pierce the capsule lid and the capsule base on or after insertion of the portion capsule in the portion capsule holder, such that hot water can enter the portion capsule through the capsule lid and the drink escapes through the capsule base from the portion capsule. The controller is provided for the provision of three differing pressures for the pressurized water, for example, for brewing espresso, white coffee and filter coffee. The capsule base of the portion capsule can comprise a pre-weakened spot.

31 Claims, 2 Drawing Sheets

U.S. PATENT DOCUMENTS

Figure 1:
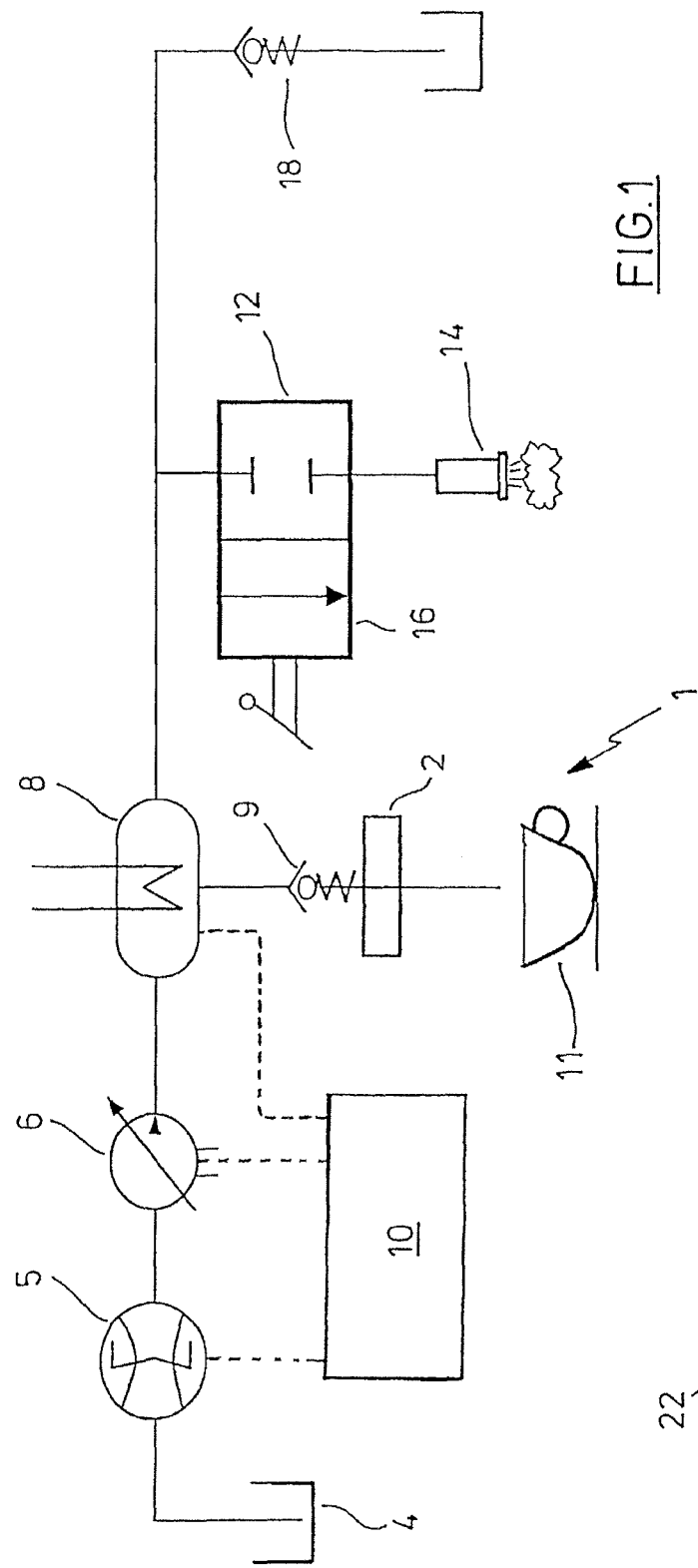

| | | | |
|---|---|---|---|
| 2005/0051033 A1* | 3/2005 | Lassota | 99/283 |
| 2005/0160918 A1* | 7/2005 | Winstanley et al. | 99/279 |
| 2005/0247205 A1* | 11/2005 | Chen et al. | 99/279 |
| 2006/0000363 A1* | 1/2006 | Streeter et al. | 99/279 |
| 2006/0196363 A1* | 9/2006 | Rahn | 99/279 |

FOREIGN PATENT DOCUMENTS

| | | |
|---|---|---|
| EP | 1344722 A1 | 2/2003 |
| JP | 5130944 A | 5/1993 |
| JP | 10043055 A | 2/1998 |
| JP | 2002028080 A | 1/2002 |
| JP | 2003265320 A | 9/2003 |
| JP | 2005225498 A | 8/2005 |
| WO | 2004098360 A1 | 11/2004 |

* cited by examiner

SYSTEM COMPRISING A COFFEE MACHINE AND A PORTION CAPSULE

The invention relates to a system having a coffee machine and a portion capsule.

EP 0 904 717 B1 discloses a coffee machine which can be used to brew up individual coffee portions (one cup or two cups of coffee). This machine is used with prefabricated coffee portions in which ground coffee is located between two layers of filter paper which are connected to one another along a common circular periphery.

Prefabricated coffee portions are also used for brewing espresso in an espresso machine.

EP 1 344 722 A1 describes a portion capsule which has a capsule lid and a capsule base, is closed on all sides in the state in which it is supplied and contains a particulate coffee substance which can be extracted by means of water. In this case a distributor device is arranged between the capsule lid and the coffee substance and a collecting device is arranged between the coffee substance and the capsule base. The distributor device and the collecting device each have a number of openings and embossments for forming liquid channels. This portion capsule is used in a coffee machine, and the capsule lid and the capsule base are perforated. Hot water passes on to the distributor device through an opening in the capsule lid and is essentially uniformly distributed by this device, so that the coffee substance in the portion capsule can be largely uniformly extracted. The prepared beverage is directed by the collecting device to an opening in the capsule base, where it passes out of the portion capsule and can be intercepted by a receptacle (e.g. a cup).

The previously known means are intended essentially for brewing just one specific type of coffee beverage, e.g. for brewing coffee with a layer of foam or for brewing espresso.

It is an object of the invention to provide a means which is intended for brewing a beverage portion (in particular a coffee portion and in particular for one or a few cups), is highly versatile in respect of beverage selection and, moreover, is cost-effective.

This object is achieved by a system having a coffee machine and a portion capsule with the features of claim 1 and by a coffee machine with the features of claim 16. A specific embodiment of the portion capsule forms the subject matter of claim 27. Advantageous configurations of the invention can be gathered from the subclaims.

The system according to the invention contains a coffee machine and a portion capsule. The coffee machine is intended for brewing a hot beverage, in particular a hot coffee beverage, by means of a portion capsule with a capsule lid and a capsule base and has a pressurized-water device, a portion-capsule holder and a control means. The portion-capsule holder is assigned two piercing means which can be moved relative to one another and by means of which, during or after the operation of inserting the portion capsule into the portion-capsule holder, the capsule lid and the capsule base can be pierced. It is thus possible for hot water to pass through the capsule lid into the interior of the portion capsule and for beverage to pass out of the portion capsule through the capsule base. The control means of the coffee machine is intended for providing at least three different pressures for the pressurized water, to be precise preferably for providing three pressures which are envisaged for brewing espresso, cafe crema and filter coffee. Particularly suitable pressures here are in the range of approximately 13 bar to 18 bar (preferably 14 bar to 16 bar) (espresso), approximately 9 bar to 13 bar (preferably 10 bar to 12 bar) (cafe crema) and approximately 3 bar to 9 bar (preferably 5 bar to 7 bar) (filter coffee).

The portion capsule has a capsule lid and a capsule base, is closed on all sides in the state in which it is supplied and contains a particulate beverage substance, preferably a coffee substance, which can be extracted by means of water. A distributor device is arranged between the capsule lid and the beverage substance and/or a collecting device is arranged between the beverage substance and the capsule base.

The distributor device and/or the collecting device are/is provided with a number of openings and preferably with embossments for forming liquid channels. Such a portion capsule is known, in principle, from EP 1 344 722 A1.

Despite a relatively straightforward and cost-effective design, the coffee machine of the system according to the invention makes it possible to brew, inter alia, very different kinds of coffee beverages, in particular to brew espresso or cafe crema or filter coffee. This is achieved by a pressurized-water device (e.g. with a controllable pump and a boiler) which, by way of a control means, can provide different pressures or pressure ranges which are optimum for the respective coffee beverage. "Coffee beverage" is to be understood here in quite general terms as a coffee-containing beverage.

The pressure mentioned here is the pressure which prevails above the capsule lid during operation of the coffee machine, that is to say essentially the pressure which drops along the length of the portion capsule as hot water and beverage extract flow through there. This pressure value could be measured directly and made available to the control means, in which case the control means can regulate the pressure for example with the aid of an activatable valve. In a preferred embodiment, however, there is no direct measurement of the pressure. Instead, the volume flow of brewing water delivered by a controllable pump is determined with the aid of a through-flow meter and is used by the control means for regulating the pumping capacity. This produces a pressure, above the capsule lid, which is made up of the characteristic curve of the pump and the flow resistance in the system. The flow resistance critically depends on the flow resistance in the portion capsule, that is to say, for example, on the degree of grinding of a coffee substance located therein, on the degree of filling and on the properties of the distributor device and of the collecting device. For predetermined or typical portion capsules, the parameters which are critical for the control means can be determined at the factory by calibration measurements and stored in the control electronics.

The beverage substance in the portion capsule is preferably envisaged for brewing espresso or cafe crema or filter coffee. It is optionally possible for further substances, also substances such as sugar, sweetener or milk powder, to be contained in the portion capsule. By selecting the appropriate type of portion capsule, one and the same coffee machine can readily be utilized for quite different types of coffee beverages and also other hot beverages. Furthermore, the distributor device and/or the collecting device of the portion capsule may be optimized for the beverage substance contained in the portion capsule. It is thus possible, for example, for the formation of foam in cafe crema to be improved by the configuration of the distributor device and/or of the collecting device if this configuration is adapted to the turbulence of the hot water in the portion capsule in the medium pressure range. The portion capsule, in addition, has the advantage that the beverage substance or coffee substance therein remains fresh for a long period of time, in particular if the walls of the portion capsule consist of aroma-tight and quasi oxygen-impermeable material. Furthermore, handling is quite straightforward with the coffee machine since, for example rather than the capsule lid first of all having to be laboriously pulled off from the portion capsule, the portion capsule as a whole is inserted into the portion-capsule holder and in the process, or thereafter, is pierced by the piercing means, this creating the openings which are necessary for brewing the beverage.

As has already been indicated, the beverage substance in the portion capsule may also be suitable for preparing other hot beverages, for which purpose the portion capsule contains, for example, tea, chocolate, instant soup or milk powder. It is also possible here for additives, e.g. sugar or sweetener, to be contained in the portion capsule as well. Furthermore, a portion capsule with liquid milk is practical for preparing the head of foamed milk on cappuccino, as will be explained hereinbelow. If the machine of the system according to the invention is to be used exclusively for preparing beverages which do not contain coffee, the designation "coffee machine", strictly speaking, is incorrect; we will continue to use it, however, for the sake of simplicity.

In a preferred embodiment, at least one of the two piercing means has a hollow spike with a tip which is provided with at least one opening. It is preferable for each of the two piercing means to have precisely one spike, and this may be arranged centrally in relation to the capsule lid and the capsule base of a portion capsule. Embodiments with precisely one spike are technically straightforward and thus advantageous. Within a portion capsule, the distributor device and the collecting device ensure that the hot water is distributed uniformly in the beverage substance and that the beverage is directed onto the spike which is assigned to the capsule base.

The coffee machine preferably has an abutment surface relative to which the portion-capsule holder can be moved and from which preferably the piercing means which is assigned to the capsule lid project. In the case of this configuration, the portion-capsule holder can be moved away from the abutment surface in order to insert a portion capsule. The portion-capsule holder is then moved to the abutment surface, in which case the piercing means which are assigned to the capsule lid (that is to say, for example, a central spike) perforate the capsule lid.

In the case of an advantageous configuration, the portion-capsule holder can be removed from the rest of the coffee machine. It is possible here for the coffee machine to have a movable retaining device which is intended for accommodating the portion-capsule holder and by means of which the portion-capsule holder can be moved toward the abutment surface and away from the abutment surface. In the case of this configuration, the portion-capsule holder is very easily accessible and can be washed separately if required.

The coffee machine preferably has an all-round seal which, when the portion capsule is inserted, can be positioned against the periphery of the capsule lid. This seal may be arranged, for example, on the abutment surface and prevents hot water which could accumulate above the capsule lid during the brewing operation from running past the portion capsule on the outside and, in the process, watering down the freshly brewed beverage. This seal also ensures that the pressure supplied by the pressurized-water device extends into the interior of the portion capsule.

In the case of a preferred embodiment, the portion-capsule holder has an insert which is intended for accommodating a portion capsule and is mounted such that it can be displaced in a mount, counter to spring pressure, in the direction of the piercing means which is assigned to the capsule base. This piercing means is fastened on the mount. The insert preferably encloses the piercing means (that is to say, for example, a central spike), in which case the user is protected against being injured by the piercing means prior to the insert being displaced onto the piercing means. If the portion capsule is inserted into such a portion-capsule holder and then the portion-capsule holder is moved, for example, toward the abutment surface, the mount is displaced downward counter to spring pressure, in which case the piercing means penetrates the capsule base or makes an incipient cut therein.

It may be advantageous if the capsule base is pierced not immediately as the portion capsule is inserted, but only when the portion capsule has been inserted, when a pressure builds up in the portion capsule. This applies, in particular, to brewing espresso. The pressure builds up once pressurized water has passed into the interior of the portion capsule. The possibly incipiently cut capsule base may curve outward here until it is pierced by the piercing means. The length of the piercing means thus has to be coordinated with the capsule-base curvature which is to be expected in the predetermined pressure range. The fact that this configuration causes the beverage to slow down as it passes out results in an improvement in aroma since the pressurized water acts on the beverage substance for a longer period of time. The capsule base is preferably incipiently cut as the portion capsule is inserted and the portion-capsule holder is pressed on to the abovementioned abutment surface, in which case the rising pressure in the portion capsule is sufficient in order for the piercing means to be able to perforate the capsule base.

The portion-capsule holder preferably has a collecting chamber for the beverage passing out of the portion capsule, the collecting chamber being connected to a beverage outflow. The coffee machine here is advantageously configured such that a receptacle, e.g. a cup or also a pot, can be positioned beneath the beverage outflow in order to accommodate the beverage passing out.

If the pressurized water has a high pressure, in particular for brewing espresso, the curvature of the capsule base is already pronounced enough, as in the case of the portion capsule known from EP 1 344 722 A1, for the piercing means which is assigned to the capsule base to be able to perforate the capsule base. If, in contrast, filter coffee is to be brewed, it is advantageous if the associated portion capsule has a predetermined weakening location on its capsule base, e.g. a piece of sheet material which is attached by adhesive bonding or sealing over an opening in the central region of the capsule base, on the inside or outside of the latter, and consists of thinner material (e.g. aluminum foil or plastic film) than the rest of the capsule base. In this case, the predetermined weakening location is perforated by the piercing means as the portion capsule is inserted and/or the portion-capsule holder is arrested, in which case, for brewing filter caffee, there is no undesirable build-up of pressure in the portion capsule. The same applies to the brewing of cafe crema.

The invention will be explained in more detail hereinbelow with reference to an exemplary embodiment.

Figure 2:
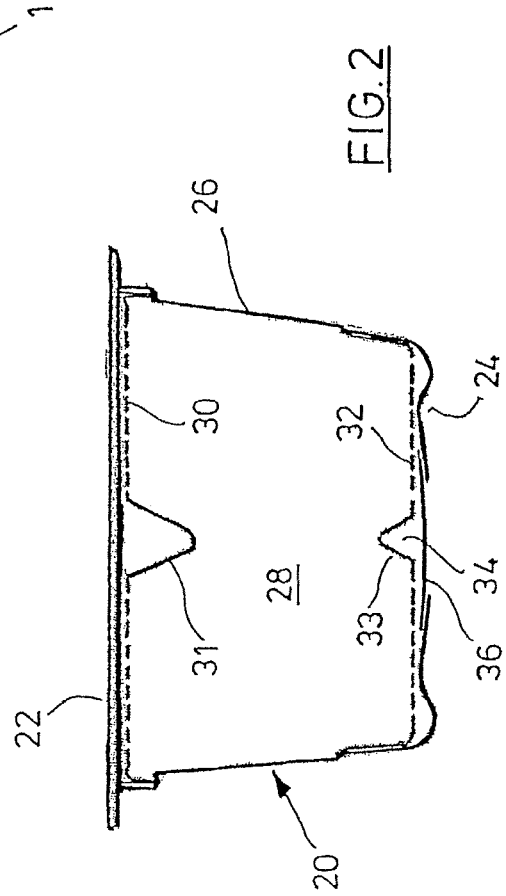
Figure 3:
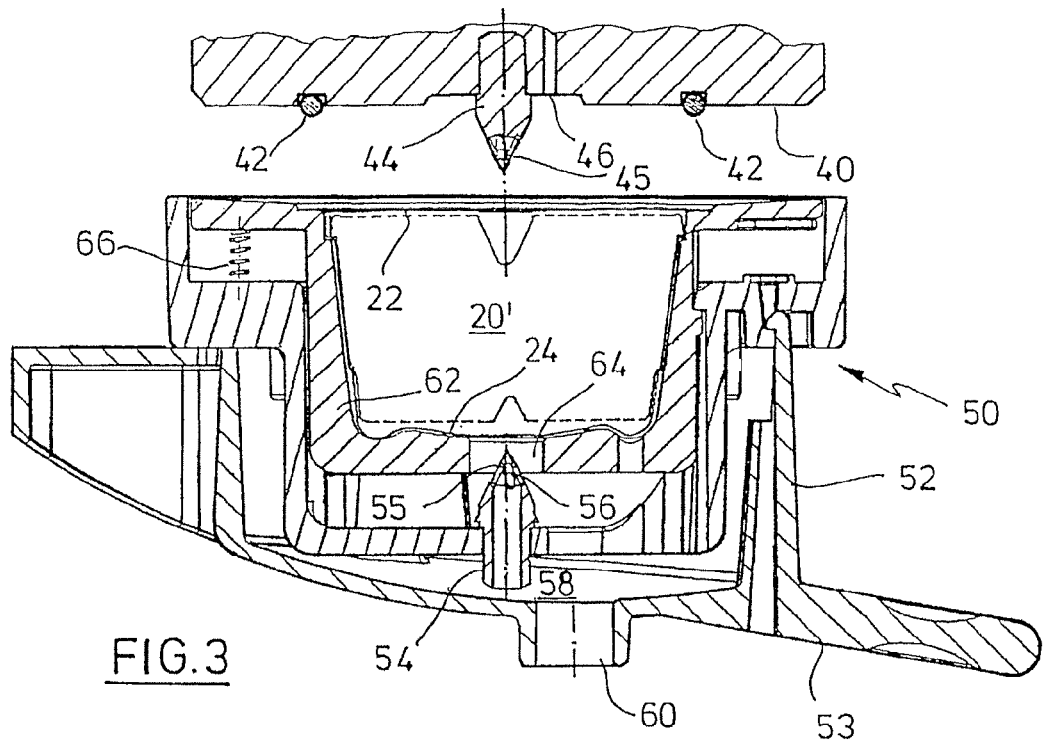
Figure 4:
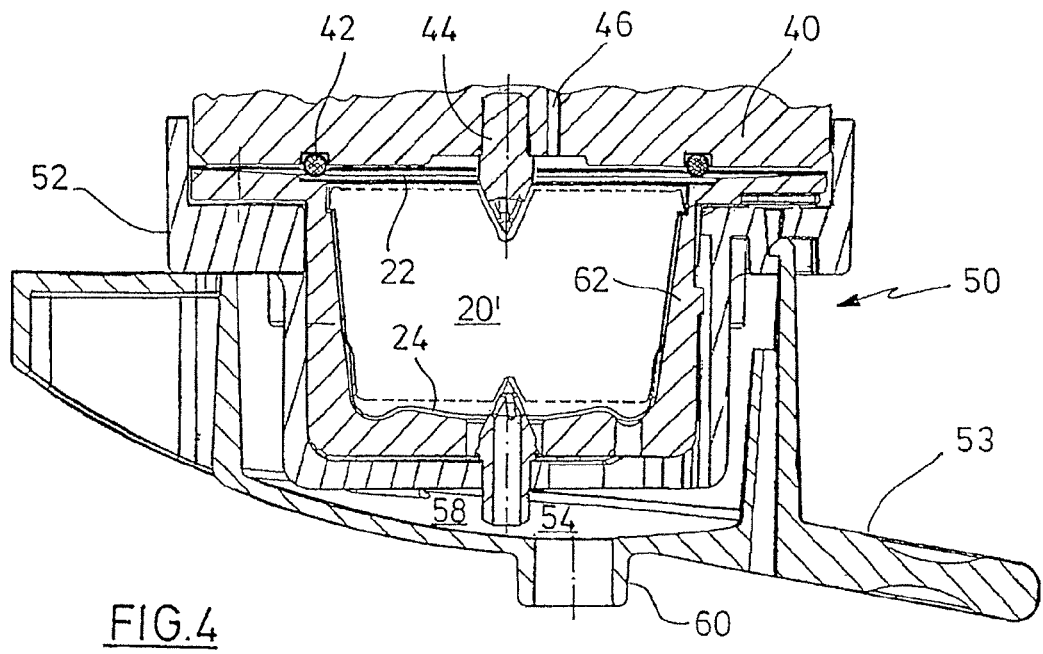

In the drawings:

FIG. 1 shows a schematic illustration (with a water-flow plan) of a coffee machine of the system according to the invention, FIG. 2 shows a schematic longitudinal section through a portion capsule of the system according to the invention, FIG. 3 shows a longitudinal section through one embodiment of the portion-capsule holder of the coffee machine with portion capsule inserted, in the starting position, and FIG. 4 shows a longitudinal section similar to that in FIG. 3, but once the portion-capsule holder has been moved into the brewing position.

FIG. 1 is a highly schematic illustration of a coffee machine 1, the functioning of the latter being explained with reference to a water-flow plan.

The coffee machine 1 has a portion-capsule holder 2 (or 50, see FIGS. 3 and 4) into which a portion capsule (see FIG. 2) with a beverage substance (in the exemplary embodiment a coffee substance) can be inserted. As will be explained hereinbelow, openings are created in the portion capsule, in which case hot water can pass into the portion capsule and extracted beverage can flow out.

During operation of the coffee machine 1 water is taken from a water supply 4 and delivered via a throughflow meter 5, by means of a pump 6, to a boiler 8. In the exemplary embodiment, the pump 6 is a piston pump which can build up relatively high pressures (e.g. 14 to 16 bar).

The boiler 8 is configured as a flow heater and has a relatively large accommodating volume (e.g. 100 ml), in order to avoid any great fluctuations in temperature. Located at the outlet of the boiler 8, and above the portion-capsule holder 2, is a valve 9 which opens at a relatively low pressure (e.g. 2 bar, less than the pressure generated by the pump 6) and prevents dripping when the pump 6 is not in operation.

In order to control the coffee machine 1, use is made of a control means 10 which is connected to the throughflow meter 5, the pump 6 and the boiler 8 via signal and control lines.

The user preselects the desired pressure in the operating mode for brewing a hot coffee beverage, this being done via preselection of the capacity of the pump 6. For example, pressures of approximately 14 to 16 bar are suitable for brewing espresso, pressures of approximately 10 to 12 bar are suitable for brewing cafe crema and pressures of approximately 5 to 7 bar are suitable for brewing filter coffee. A portion capsule which is suitable for the respective coffee beverage is inserted into the portion-capsule holder 2 here.

In the exemplary embodiment, the signal of the throughflow meter 5 is used for regulating the volume flow of pressurized water, as was also explained in the introduction. This is because filter coffee has to be brewed with a low volume flow, otherwise it foams up, whereas, for cafe crema, it is precisely a foaming-up action which is desired, for which reason a large volume flow is used in this case. Espresso requires the highest volume flow. In the exemplary embodiment, however, there is no regulation of the volume flow for espresso; instead, the portion capsule is subjected to the full pressure of the pump 6, and this establishes a volume flow in dependence on the flow resistance in the portion capsule, this depending essentially on the degree to which the coffee substance has been ground.

The hot pressurized water runs through the portion capsule and, following passage out of the portion capsule, the freshly brewed coffee beverage flows into a container positioned beneath the portion-capsule holder 2, e.g. into a cup 11.

In addition to the mode of operation explained above, which serves for brewing different kinds of hot coffee beverages and for which a water temperature of less than 100° C. is generated in the boiler 8, the coffee machine 1 also permits a further mode of operation. In this case the pump 6 operates slowly and generates only a low excess pressure. The boiler 8 is heated up to above 100° C., this producing steam which can pass, via a steam valve 12, out of a nozzle 14 located at the end of a tube component. An actuating device 16 serves for controlling the steam. If the nozzle 14 is held, for example, in a receptacle containing milk, the milk foams up and can be used, for example, as a head of foam for a coffee beverage which has just been brewed.

It is also conceivable to produce foamed milk with the aid of a portion capsule which contains milk and has been inserted into the portion-capsule holder 2. In this case, hot water or steam is directed via the valve 9.

A safety valve 18 is provided in order to limit the excess pressure generated by the pressurized-water device in the coffee machine 1.

FIG. 2 illustrates a schematic longitudinal section of a portion capsule 20, as is known, in principle, from EP 1 344 722 A1.

The portion capsule 20, which in the exemplary embodiment is of circular cross section, has a capsule lid 22, a capsule base 24 and a side wall 26 running all the way round. In the exemplary embodiment, the portion capsule 20 contains, in its interior, coffee substance 28 which is appropriate for the coffee beverage which is to be brewed. The coffee substance 28 contains ground coffee which is suitable, for example, for brewing espresso, cafe crema or filter coffee.

A distributor device 30 with a depression 31 is arranged beneath the capsule lid 22 and a collecting device 32 with an elevation 33 is arranged above the capsule base 24. The coffee substance 28 is located between the distributor device 30 and the collecting device 32. The distributor device 30 and the collecting device 32 are each provided with a number of openings and embossments for forming liquid channels. The distributor device 30 thus makes it possible for hot water which passes centrally into the portion capsule 20 (see below) to be distributed largely uniformly in the portion capsule 20, in which case the coffee substance 28 is extracted essentially uniformly. The freshly brewed coffee beverage collects on the collecting device 32 and, with the aid of the latter, is directed outward through a central opening in the capsule base 24 (see below). The distributor device 30 and/or the collecting device 32 may be adapted in configuration to the type of coffee beverage which is to be brewed, e.g. in order, in the case of cafe crema, to improve the formation of foam.

In the specific configuration of the portion capsule 20 according to FIG. 2, the capsule base 24 is provided with a central opening 34 which is covered with a piece of sheet material 36 which is attached to the inside by sealing. The piece of sheet material 36, in comparison with the rest of the capsule base 24, forms a weakening location and can thus be penetrated more easily by a piercing means. It is likewise conceivable for the piece of sheet material 36 to be adhesively bonded or to be attached by sealing or adhesive bonding on the outside of the capsule base 24. Portion capsules 20 with a weakening location on the capsule base 24 are suitable, in particular, for brewing filter coffee or cafe crema.

The portion capsule 20 and the piece of sheet material 36 may be produced, for example, from plastic film or aluminum foil.

Where the portion capsule 20 is filled with coffee substance 28 in the exemplary embodiment, it is also conceivable to use other beverage substances, e.g. tea, chocolate, instant soup, milk powder or, as has already been mentioned, liquid milk.

FIGS. 3 and 4 show a detailed longitudinal section through one embodiment of the portion-capsule holder 2, in this case designated by 50. Also illustrated is an abutment surface 40 which is located on the coffee machine 1 and is accessible from beneath. The portion-capsule holder 50 can be displaced upward or downward relative to the abutment surface 40 with the aid of a movable retaining device, which has not been depicted in the figures. FIG. 3 shows a starting position, in which the portion-capsule holder 50, rather than butting against the abutment surface 40, is still spaced apart therefrom. FIG. 4 illustrates the brewing state, when the portion-capsule holder 50 butts against the abutment surface 40.

In the exemplary embodiment, it is possible for the portion-capsule holder 50, in the starting position, to be removed from the abovementioned retaining device in order for a portion capsule (designated by 20' here) to be inserted or removed or for the portion-capsule holder 50 to be washed if required. In the brewing state, the retaining device is arrested with the aid of a lever.

The abutment surface 40 is provided with an annular groove in which an all-round seal 42 is arranged. The seal 42 butts against the periphery of the capsule lid 22 in the brewing state, see FIG. 4. From the center of the seal 42, a solid spike 44 with a tip 45 projects downward from the abutment surface 40. Located alongside the spike is a water inflow 46, which is connected to the boiler 8 via the valve 9.

The portion-capsule holder 50 has a mount 52 with a handle 53. A hollow spike 54 with a tip 55, which contains a plurality of openings 56, projects upward from the bottom region of the mount 52. The hollow spike 54 opens out into a collecting chamber 58, which can discharge the brewed coffee beverage outward, e.g. into a cup positioned beneath the portion-capsule holder 50, via a beverage outflow 60.

The mount 52 guides an insert 62, which can be moved upward and downward on the mount 52. The bottom region of the insert 62 is provided with an opening 64 which is adapted to the hollow spike 54. The periphery of the insert 62 is supported on the mount 52 via helical springs 66. In the starting position according to FIG. 3, the insert 62 is thus displaced upward relative to the mount 52 and protects the user against being injured by the hollow spike 54.

When the portion-capsule holder 50 is moved into the brewing position, the abutment surface 40 presses the insert 62 downward, see FIG. 4. The spike 44 here passes through the capsule lid 22 of the portion capsule 20' inserted into the insert 62, while the hollow spike 54 penetrates the capsule base 24 as the insert 62 moves downward, see FIG. 4. This applies to portion capsules with a predetermined weakening location on the capsule base 24 (e.g. for filter coffee or cafe crema), whereas a capsule base 24 without a predetermined weakening location (e.g. for espresso) is only provided with an incipient cut by the hollow spike 54 at this stage, see below.

Once the valve 9 opens in the brewing position, pressurized hot water passes through the water inflow 46, and the opening in the capsule lid 22 created by the spike 44, into the interior of the portion capsule 20' and is distributed in the coffee substance 28 by the distributor device 30. The prepared coffee beverage is directed to the hollow spike 54 by the collecting device 32 and passes out of the coffee machine 1 via the collecting chamber 58 and the beverage outflow 60.

As has already been mentioned, in the case of the portion capsule 20' (for filter coffee or cafe crema), both the capsule lid 22 and the capsule base 24 are pierced when the portion-capsule holder 50 has reached the brewing position according to FIG. 4. In the case of a portion capsule for espresso, the capsule base has no predetermined weakening location and is therefore initially only provided with an incipient cut in the brewing position of the portion-capsule holder 50. It is only when, following the introduction of the hot water, a pressure is built up in the interior of the portion capsule that the capsule base curves downward to the extent where the tip 55 of the hollow spike 54 can penetrate all the way through the capsule base. In the case of this configuration, the hot water remains in the interior of the portion capsule for a relatively long period of time and pressure is built up there, which may result in improved extraction and aroma-specific advantages.

The invention claimed is:

1. A coffee machine operable to brew a hot beverage through a portion capsule with a capsule lid and a capsule base, the coffee machine comprising:
   a pressurized-water device;
   a portion-capsule holder;
   a control means; and
   piercing elements which can be moved relative to one another to thereby pierce the capsule lid and capsule base, such that hot water is permitted to pass into the pierced portion capsule through the capsule lid and brewed liquid is permitted to pass out of the pierced portion capsule though the capsule base,
   said control means being operable to provide at least three different pressures for the pressurized water,
   said control means being operable to provide the three pressures corresponding to brewing of different hot beverages, with the different hot beverages being selected from the group consisting of espresso, cafe crema, and filter coffee.

2. The coffee machine as claimed in claim 1,
   said three pressures being in the range of approximately 13-18 bar, approximately 9-13 bar, and approximately 3-9 bar, respectively.

3. The coffee machine as claimed in claim 1,
   at least one of the piercing elements including a hollow spike with a tip presenting at least one opening.

4. The coffee machine as claimed in claim 1, each of the piercing elements including only one spike.

5. The coffee machine as claimed in claim 1,
   said coffee machine presenting an abutment surface relative to which the portion-capsule holder can be moved.

6. The coffee machine as claimed in claim 5, said portion-capsule holder being removable from the rest of the coffee machine.

7. The coffee machine as claimed in claim 1,
   said coffee machine including an endless seal,
   said capsule lid presenting an outer peripheral margin, with the endless seal configured to be positioned against the outer peripheral margin.

8. The coffee machine as claimed in claim 1,
   said portion-capsule holder including a mount and an insert that is configured to receive the portion capsule, with the insert being shiftably mounted in the mount,
   one of said piercing elements being fastened on the mount, with the insert operable to be shifted such that it can be displaced, counter to spring pressure, in the direction of the one piercing element.

9. The coffee machine as claimed in claim 1,
   one of said piercing elements being configured to pierce the capsule base only once the portion capsule has been inserted, when a pressure builds up in the portion capsule.

10. The coffee machine as claimed in claim 1,
    said portion-capsule holder including a collecting chamber operable to receive beverage passing out of the portion capsule, and further including a beverage outflow fluidly connected to the collecting chamber.

11. The system as claimed in claim 2,
    said three pressures being in the range of approximately 14-16 bar, approximately 10-12 bar, and approximately 5-7 bar, respectively.

12. The coffee machine as claimed in claim 4,
    said only one spike operable to be arranged centrally in relation to the capsule lid and the capsule base when the portion capsule is inserted.

13. The coffee machine as claimed in claim 5, one of said piercing elements projecting from the abutment surface.

14. The coffee machine as claimed in claim 6,
    said coffee machine including a movable retaining device which is operable to accommodate the portion-capsule holder and by means of which the portion-capsule holder can be moved relative to the abutment surface.

15. A system comprising:

a portion capsule including a capsule lid and a capsule base, with the portion capsule being enclosed on all sides and thereby containing a particulate beverage substance which is configured to be extracted by water, said portion capsule including a perforated device arranged between the particulate beverage substance and at least one of the capsule lid and the capsule base, with the perforated device presenting a number of openings; and a coffee machine operable to brew a hot beverage and including a pressurized-water device, a portion-capsule holder and a control means, said coffee machine further including piercing elements which can be moved relative to one another to thereby pierce the capsule lid and capsule base such that hot water is permitted to pass into the pierced portion capsule through the capsule lid and brewed liquid is permitted to pass out of the pierced portion capsule though the capsule base, said control means being operable to provide at least three different pressures for the pressurized water, said control means being operable to provide the three pressures corresponding to brewing of different hot beverages, with the different hot beverages being selected from the group consisting of espresso, cafe crema, and filter coffee, said particulate beverage substance in the portion capsule comprising a coffee substance operable to brew espresso, cafe crema, or filter coffee.

16. The system as claimed in claim 15, said three pressures being in the range of approximately 13-18 bar, approximately 9-13 bar, and approximately 3-9 bar, respectively.

17. The system as claimed in claim 15, at least one of the piercing elements including a hollow spike with a tip presenting at least one opening.

18. The system as claimed in claim 15, each of the piercing elements including only one spike.

19. The system as claimed in claim 15, said coffee machine presenting an abutment surface relative to which the portion-capsule holder can be moved.

20. The system as claimed in claim 19, said portion-capsule holder being removable from the rest of the coffee machine.

21. The system as claimed in claim 15, said coffee machine including an endless seal, said capsule lid presenting an outer peripheral margin, with the endless seal being positioned against the outer peripheral margin.

22. The system as claimed in claim 15, said portion-capsule holder including a mount and an insert that receives the portion capsule, with the insert being shiftably mounted in the mount, one of said piercing elements being fastened on the mount, with the insert operable to be shifted such that it can be displaced, counter to spring pressure, in the direction of the one piercing element.

23. The system as claimed in claim 15, one of said piercing elements being configured to pierce the capsule base only once the portion capsule has been inserted, and when a pressure builds up in the portion capsule.

24. The system as claimed in claim 15, said portion-capsule holder including a collecting chamber operable to receive beverage passing out of the portion capsule, and further including a beverage outflow fluidly connected to the collecting chamber.

25. The system as claimed in claim 15, said capsule base presenting a predetermined weakening location.

26. The system as claimed in claim 25, said portion capsule including a piece of film material that forms the predetermined weakening location.

27. The system as claimed in claim 16, said three pressures being in the range of approximately 14-16 bar, approximately 10-12 bar, and approximately 5-7 bar, respectively.

28. The system as claimed in claim 18, said only one spike being arranged centrally in relation to the capsule lid and the capsule base when the portion capsule is inserted.

29. The system as claimed in claim 19, one of said piercing elements projecting from the abutment surface.

30. The system as claimed in claim 20, said coffee machine including a movable retaining device which is operable to accommodate the portion-capsule holder and by means of which the portion-capsule holder can be moved relative to the abutment surface.

31. The system as claimed in claim 26, said piece of film material being arranged in a central region of the capsule base.

* * * * *